2,970,081
MYCOBACTERIOSTATS

Ernest Bryson McCall, Llangollen, Wales, and David Alexander Lindsay Seiler, Burnham, England, assignors to Monsanto Chemicals Limited, London, England, a British company No Drawing. Filed July 31, 1958, Ser. No. 752,202

10 Claims. (Cl. 167—30)

This invention relates to soaps, waxes and plastics containing additives which give them mycobacteriostatic properties, that is to say both bacteriostatic and fungistatic properties.

Although some soaps show a certain amount of bacteriostatic activity, this activity is not in general sufficiently high to be significant. For many years therefore additives have been incorporated in soaps in order to improve their bacteriostatic properties, with more or less success. Very many substances which have strong bacteriostatic properties in the absence of soaps lose much or all of their activity when they are incorporated in soaps. For instance, chlorinated phenols exhibit a very high bacteriostatic activity, but in general when they are incorporated in soaps this activity is so diminished as to be of little or no value.

In recent years much effort has been expended in trying to find compounds which retain their bacteriostatic activity in the presence of soaps. Many old compounds of known activity have been tested, but of these very few have been discovered to have the properties required, and the successful selection of a compound which has the required properties out of a vast number of substances having general germicidal activity has proved a matter for prolonged research. The matter is of course even more difficult if the field of possibilities is extended to include compounds about which nothing whatever is known of their bacteriostatic properties.

Similarly wax and plastic compositions tend to inhibit the activity of bacteriostats incorporated in them for the purpose of obtaining, for example, bacteriostatic wax polishes and bacteriostatic plastic sheeting, and the discovery of a substance which retains its activity in these circumstances is a matter of importance. Moreover the activity of a substance exhibiting fungistatic properties is likely to be inhibited by soaps, waxes and plastics in the same way.

It has now been discovered that certain organic peroxy compounds act as effective mycobacteriostats in general, and particularly that they retain their activity even in the soap, wax and plastic compositions where as is mentioned above difficulties arise. The particular compounds which have been found to have these desirable properties are aromatic hydroperoxides and their salts, such as for instance cumene hydroperoxide and its sodium salt. In soaps the aromatic hydroperoxides and their salts not only do not cause any discolouration, but in some instances even appear to improve the colour of a white soap.

The invention accordingly includes a soap, wax or plastic composition in which there is incorporated an aromatic hydroperoxide or its salt as mycobacteriostat.

Also part of the invention is the use of an aromatic hydroperoxide or its salt for preventing the growth of bacteria and fungi, for instance by a process in which an article, such as a piece of clothing, is treated with the hydroperoxide or its salt. The substances act as volatile fungistats and bacteriostats and there is accordingly no need for them to be placed in direct physical contact with a surface or article to be treated or protected against fungi and bacteria.

Preferred aromatic hydroperoxides are those of structure:

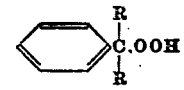

where each R is an aliphatic group, particularly an alkyl group or a substituted alkyl group, for example a chloroalkyl group. Preferably each group R is a methyl group, as in cumene hydroperoxide itself, but other suitable alkyl groups are for instance ethyl, propyl and butyl groups. The benzene ring of the hydroperoxide can be further substituted, for example by an alkyl group or a halogen atom, such as chlorine; an example of such a nuclear-substituted compound is for instance the hydroperoxide of p-methyl isopropylbenzene (that is to say p-menthane). The hydroperoxides are in many instances obtained in the form of a solution in the alkylbenzenes from which they are derived by oxidation, and these solutions can conveniently be used as a source of the hydroperoxide. Thus cumene hydroperoxide is obtainable as a solution in cumene, containing from 10 to 90% of the peroxide. However if desired a pure hydroperoxide can of course be employed.

Salts of aromatic hydroperoxides that can be used are for instance the sodium or potassium salts. A salt such as the sodium salt that is water-soluble is of course useful where an aqueous mycobacteriostatic composition is to be formulated.

When one of the hydroperoxides or salts is used in soaps, these can be for instance common soap, as well as other soaps derived from natural oils, for example potassium soaps. The soap incorporating the mycobacteriostat can be made up in tablet form or as an aqueous composition in liquid form. Waxes in which the hydroperoxide or its salt can be used as mycobacteriostat can for instance be animal, vegetable or mineral waxes, for example beeswax, carnauba wax and paraffin wax; wax polishes can also be employed. Plastic compositions which are suitable include both thermoplastic resins, such as vinyl polymers and copolymers (for instance polystyrene, polyvinyl chloride and polyethylene), and thermosetting resins, for example phenol or melamine resins.

The hydroperoxide or its salt can be incorporated in soaps and waxes by merely mixing with the liquid soap or wax; if convenient a free hydroperoxide can be in admixture with an organic solvent, such as ethyl alcohol. From 0.05% to 5% and preferably about 0.5% to 2% of the mycobacteriostat by weight of the substance treated is suitable, though the amount incorporated in practice will depend on the level of activity desired and the particular peroxide chosen as the mycobacteriostat. Similar quantities can be incorporated in plastic compositions, for instance by adding the mycobacteriostat to a granular thermoplastic resin and then moulding the resin in the form desired, perhaps as sheet.

The invention is illustrated by the following examples:

Example 1

This example illustrates the mycobacteriostat activity of cumene hydroperoxide in castor oil soap.

A 5 cc. portion of an ethanolic solution of cumene hydroperoxide (containing 0.1 gram of the hydroperoxide) was diluted with an equal volume of ethanol, and a second 5 cc. portion of the solution with an equal volume of 50% by weight aqueous castor oil soap. A circle of filter paper of 1 cm. diameter was immersed in each portion of solution, removed, allowed to dry and placed on a nutrient agar plate (Oxoid Nutrient Broth No. 2) which has been seeded with a 24 hour culture of *Staphylococcus aureus*, and the plate was then incubated for 24 hours at 37° C. The average distance from the edge of the paper outwards to the edge of the area of inhibition was then measured. The test was repeated and the mean taken of the measurements.

Precisely similar procedures were then followed except that the culture used was one of *Salmonella typhi*, and one of *Bacillus mycoides*.

The results were as follows:

|  | Zone of inhibition, mm. | | |
|---|---|---|---|
|  | Staph. aureus | Salmonella typhi | Bacillus mycoides |
| Soap solution containing ca. 1% cumene hydroperoxide | 5.0 | 2.5 | 2.0 |
| Solution in absence of soap | 5.0 | 2.5 | 2.0 |

The results show how the effectiveness of the hydroperoxide against bacteria was unaffected by the presence of soap.

*Example 2*

This example illustrates the effectiveness of the mycobacteriostatic activity of cumene hydroperoxide in soap by means of a hand washing test. The test used was substantially that described by Cade in "Soap and Sanitary Chemicals," 1950, 26, No. 7, page 34, as modified by Price in the "Journal of the American Medical Association," vol. III, 1953.

A soap composition was prepared by adding cumene hydroperoxide (in the form of a 50–55% solution in cumene) to a 20% by weight solution of an unperfumed soap in water at a temperature of 60° C., so that the final composition contained 1.5% by weight of cumene hydroperoxide. The resulting solution solidified and was divided up into a number of small blocks of the treated soap.

Four people used only the treated soap for washing their hands during the period of the test; they did not use any lotions, creams or solvents which were likely to remove bacteria from the hands. The tests extended over a period of twelve days and determinations of the bacteria on the hands were carried out at the beginning and end of the test period by the following method.

Five basins each containing 2000 cc. of ordinary tap water were used per person each time a count was made. The wash procedure consisted of moistening the hands, applying the treated soap for 15 seconds, lathering for 60 seconds, rinsing for 15 seconds. This cycle was repeated in each of the five basins. From the first, fourth and fifth basins 0.1 cc. duplicate samples of wash water were taken, each sample was placed in a Petri dish, and 20 cc. of a nutrient agar (Oxoid Nutrient Broth No. 2) at 45° C. were added to each dish. The dishes were rotated to facilitate mixing, allowed to harden, and incubated at 37° C. for 48 hours. After incubation the number of colonies developing in each dish were counted on a Quebec colony counter and the total bacterial count appropriate to the volume of water in each basin was calculated by multiplying by the dilution factor. A control count was also made in the same way in respect of each basin prior to washing the hands. The control count was then subtracted from the wash water count to obtain the number of organisms removed from the hands in each instance. The percentage reduction of the residual bacterial flora was calculated from the reduction in numbers in the fifth basin counts between the first day and twelfth day.

The results were as follows:

| Expt. | Initial Count | Final Count | Percentage Reduction |
|---|---|---|---|
| 1 | 6,580,000 | 1,850,000 | 71.9 |
| 2 | 3,720,000 | 1,150,000 | 69.1 |
| 3 | 4,720,000 | 1,750,000 | 63 |
| 4 | 4,780,000 | 1,720,000 | 64.1 |

A similar test using untreated soap showed no reduction in the bacterial count on the hands over the test period.

The results show the effectiveness of cumene hydroperoxide in soap used under normal conditions.

*Example 3*

This example describes the use of cumene hydroperoxide as a mycobacteriostat in a wax polish.

1 gram of cumene hydroperoxide (in the form of an 85% by weight solution in cumene) was incorporated in 99 grams of a commercial solid wax polish simply by mixing thoroughly at room temperature. A circle of filter paper of 1 cm. diameter was covered with a thin film of the wax composition and placed on an agar plate which had been seeded with *Staphylococcus aureus*, and the bacteriostatic properties of the composition on the treated filter paper were measured as described in Example 1.

The procedure was repeated against the organisms *Salmonella typhi* and *Bacillus mycoides*. A blank experiment was also performed using an untreated wax polish.

The results were as follows:

|  | Zone of inhibition, mm. | | |
|---|---|---|---|
|  | Staph. aureus | Salmonella typhi | Bacillus mycoides |
| Wax polish containing ca. 1% cumene hydroperoxide | 7.0 | 4.0 | 2.0 |
| Untreated wax polish | 0 | 0 | 0 |

The results show how the treated polish inhibited the growth of the organisms.

*Example 4*

This example also describes the production of a wax polish containing cumene hydroperoxide as fungicide.

2 grams of cumene hydroperoxide (in the form of an 85% by weight solution in cumene) were incorporated in 98 grams of a commercial solid wax polish by mixing thoroughly at room temperature. This polish was then employed to polish a strip of linoleum (1 foot x ½ foot) daily for five days. At the end of this period one inch squares were cut from the linoleum, stored for 24 hours, and each square was then placed on an agar plate which had been seeded with *Staphylococcus aureus*. The procedure was repeated using the organism *Bacillus mycoides*, as well as in a control experiment carried out with linoleum which had been polished in a similar way with the untreated wax polish. In each instance the "zone of inhibition" was measured as described in Example 1.

The results were as follows:

|  | Zone of inhibition, mm. | |
|---|---|---|
|  | Staph. aureus | Bacillus mycoides |
| Wax polish containing ca. 2% cumene hydroperoxide | 2 | 4 |
| Untreated polish | 0 | 0 |

The results show the measure of bacteriostatic protection which would be built up in practice after using the wax polish for only a short time.

What we claim is:

1. A solid oranic composition selected from the group consisting of soaps, waxes, and plastics which have therein a bacteriostatic amount of the compound of the structure

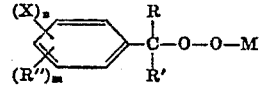

wherein X is a halogen atom and R, R', and R" are selected from the group consisting of alkyl groups having up to 4 carbon atoms and halo substituted alkyl radicals of which the alkyl radical has up to 4 carbon atoms; wherein $m$ and $n$ are integers from zero (0) to two (2); and wherein M is an atom selected from the group consisting of hydrogen and salt forming metals.

2. The composition defined by claim 1 wherein the organic composition is a soap.

3. The composition defined by claim 1 wherein the organic composition is a wax.

4. The composition defined by claim 1 wherein the organic composition is a synthetic plastic.

5. A composition defined by claim 1 wherein the incorporated compound is present in the amount of from 0.05 to 5.0 percent.

6. A solid organic composition subject to bacterial attack of the group consisting of waxes, soaps, and plastics containing incorporated therein from 0.05 to 5.0 percent of an alkyl substituted benzyl hydroperoxide said alkyl substituent having from 1 to 4 carbon atoms.

7. A solid organic composition subject to bacterial attack of the group consisting of waxes, soaps, and plastics containing incorporated therein from 0.05 to 5.0 percent of the sodium salt of an alkyl substituted benzyl hydroperoxide said alkyl substituent having from 1 to 4 carbon atoms.

8. A soap containing incorporated therein from 0.05 to 5.0 percent of cumene hydroperoxide.

9. A wax containing incorporated therein from 0.05 to 5.0 percent of cumene hydroperoxide.

10. A synthetic plastic containing incorporated therein from 0.05 to 5.0 percent of cumene hydroperoxide.

References Cited in the file of this patent

UNITED STATES PATENTS

| | | |
|---|---|---|
| 2,041,264 | O'Kane | May 19, 1936 |
| 2,566,092 | Mayfield | Aug. 28, 1951 |
| 2,621,163 | Coash | Dec. 9, 1952 |
| 2,687,964 | Kennedy | Aug. 31, 1954 |
| 2,844,506 | Jenkins | July 22, 1958 |

OTHER REFERENCES

Frear: A Catalogue of Insecticides and Fungicides, vol. II, 1948, Chronica Botanica Co., p. 33.

Reddish: Antiseptics, Disinfectants, Fungicides and Chem. and Physical Sterilization, Lea and Febiger, 1957, pp. 676–679.